United States Patent [19]

Bardos et al.

[11] Patent Number: 4,633,351
[45] Date of Patent: Dec. 30, 1986

[54] METHOD AND APPARATUS FOR HYDRODYNAMIC MAGNETIC RECORDING

[75] Inventors: Andrew M. Bardos, Indian Harbour Beach; Jon E. Holmes, West Melbourne; Mark F. Duchesne, Indian Harbour Beach, all of Fla.

[73] Assignee: Harris Graphics Corporation, Melbourne, Fla.

[21] Appl. No.: 763,258

[22] Filed: Aug. 7, 1985

Related U.S. Application Data

[63] Continuation-in-part of Ser. No. 519,759, Aug. 2, 1983, abandoned.

[51] Int. Cl.⁴ .......................... G11B 5/60; G11B 15/64
[52] U.S. Cl. ........................................ 360/102; 360/87; 360/103
[58] Field of Search ................... 360/103, 102, 59, 87; 346/74.5

[56] References Cited

U.S. PATENT DOCUMENTS 2,969,435  1/1961  Lynott ................................. 360/103
3,005,675  10/1961  Ledin et al. .......................... 360/102

FOREIGN PATENT DOCUMENTS 1239354  4/1967  Fed. Rep. of Germany ...... 360/103

*Primary Examiner*—John H. Wolff
*Attorney, Agent, or Firm*—Antonelli, Terry & Wands

[57] ABSTRACT

Problems of wear and bounce created by imperfections in the surface of a magnetic recording medium, such as a chromium dioxide-coated drum, are circumvented by a hydrodynamic magnetographic imaging technique that provides the intended effective intimate contact between the recording head the magnetographic recording surface. A readily evaporatable liquid (e.g. water, alcohol, acetone) is applied to the surface of the drum slightly upstream of the location of the recording head, so as to create a liquid bearing against which the recording head is urged, and thereby intimately magnetically coupled with the surface of the drum, except for an extremely thin liquid film between the head and drum surface. As a result of this extremely thin liquid bearing, continuous pressure can be applied to the head to maintain the head in effective intimate contact with the surface of the recording medium without the fear of scratching the medium or causing wear on the head. Moreover, once the imaging process has been completed, and the recording head is retracted away from the drum (and the liquid bearing) the liquid bearing can be easily removed, as the liquid of which the bearing if formed, readily evaporates without leaving a residue, so that the drum is ready for the application of toner particles at a print station.

36 Claims, 3 Drawing Figures

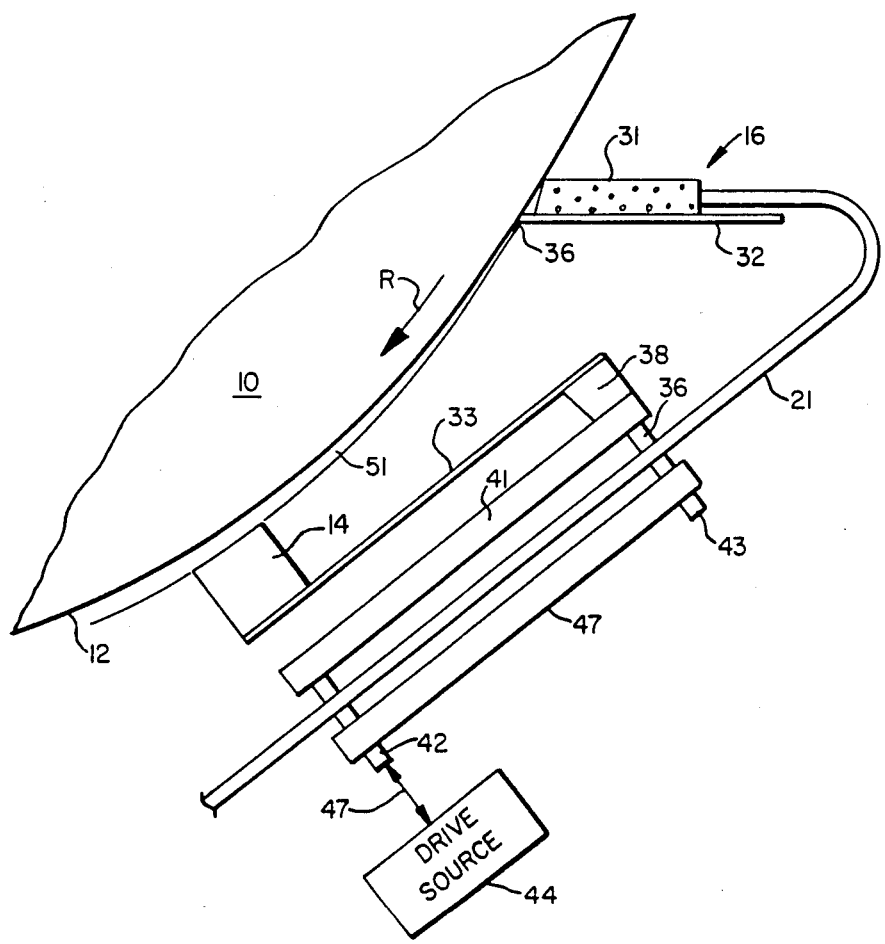

METHOD AND APPARATUS FOR HYDRODYNAMIC MAGNETIC RECORDING

CROSS REFERENCE TO RELATED APPLICATIONS

The present application is a continuation-in-part of U.S. patent application Ser. No. 519,759 filed Aug. 2, 1983, now abandoned entitled "Method and Apparatus for Hydrodynamic Magnetic Recording" by Andrew M. Bardos and Jon E. Holmes and assigned to the Assignee of the present application.

FIELD OF THE INVENTION

The present invention relates in general to magnetic imaging on a recording medium, such as a drum or disk, and particularly to a technique for improving the coupling between a magnetic recording head and the surface of the recording medium.

BACKGROUND OF THE INVENTION

The information recording mechanism of a magnetographic recording apparatus may take on various configurations, such as one using an optical exposure station for selectively erasing (demagnetizing) a premagnetized recording medium (e.g. chromium oxide), or a configuration employing a magnetic write head through which a latent image of the information to be recorded is directly magnetically written onto the recording medium. (For a description of the general configuration of each of these types of recording schemes, attention may be directed to the U.S. Pat. No. 4,216,282, to Edwards et al for example.) In these configurations and in magnetographic recording apparatus in general, the fidelity with which the magnetic storage state of the magnetic recording medium can be accurately controlled is the principal factor for determining successful performance. While such fidelity is obviously an a priori requirement in an apparatus in which the recording mechanism constitutes a magnetic recording head, it also holds true in other configurations, such as one employing an optical exposure station, mentioned above, since that mechanism still requires a complete premagnetization of the entire recording surface and, to date, the principal expedient for accomplishing this task has been a magnetic head.

Now, although the manufacturing tolerances of the recording head can be controlled with precision, the surface of the recording medium, usually chromium dioxide, with which the magnetic head is intended to have effective intimate contact, usually does not have the desired, perfect geometric profile for establishing such effective intimate contact for any location on the recording surface. More particularly, the surface of the recording medium, (such as $CrO_2$ layer, formed on the surface of a rotatable drum) typically contains imperfections including bumps and seams in the recording material itself, and contamination by foreign matter, such as dust and toner particles which, even with the provision of cleaning devices such as vacuum knives, may not be perfectly removed.

Because the quality of the image that is formed on the surface of the recording drum by the magnetic recording head depends on the degree of coupling between the recording head and the drum surface, imperfections on the surface of the recording medium, such as those exemplified above, may, depending upon drum rotational speed, constitute a source of degradation in both the image quality and the physical surface of the drum and/or the recording head during the movement of the drum past the head. Not only are imperfections on the drum surface a cause of head bounce, but because the head is under pressure to maintain contact and thereby maximum magnetic coupling between head and drum, both the head and the drum are subject to wear, and plate-out (the disposition of magnetic medium onto the magnetic head) may occur.

At low rotational velocities of the recording drum, the head can slide on the chromium dioxide layer without causing damage and without losing contact with the recording surface, so that the imperfections are not a serious problem. Also, at very high velocities, using a high quality magnetic disk or drum surface medium, the aerodynamic bearing that is created by the high relative rotational velocity between the recording surface and the head can be utilized in conjunction with the high quality medium to diminish the above problems. At a medium-range of velocities, however, (on the order of 50 to 150 inches per second, imperfections in the drum surface cannot be ignored, but instead, subject the imaging process to the above-mentioned drawbacks.

One proposed solution for solving the inadequacy of the use of an air bearing between the recording head and the surface of the recording medium involves the use of an oil bearing, such as that described in the U.S. Pat. Nos. 3,005,675 to Ledin et al and 2,969,435 to Lynott. In the recording mechanism described in these patents a film of oil is applied to the recording surface to prevent damage to the surface due to adhering metal and dirt particles and to eliminate frictional contact between the recording head and the drum surface, as the head is caused to effectively ride upon the oil bearing.

Where the recording medium is employed for the reproduction of the recorded information, as by transfer of an image of the recorded information to a sheet or web, as in a magnetographic recording/reproduction apparatus, the use of an oil bearing is not a viable solution to the problem, since the surface of the recording medium (drum) must be clean before the application of the image transfer material (toner) for each (successive) reproduction of the magnetically recorded image. Oil is an organic compound often derived from petroleum sources and, depending upon its grade, may have a boiling point over a wide range, e.g. 100°-200° C.; 175°-275° C.; and 250°-400° C. As a result, in a recording/reproduction apparatus oil is totally unsuited as a bearing material since the oil will only partial disappear through evaporation, as the higher-boiling components of the oil remain as residual films. If toner were applied to a oil-film containing drum the reproduction process would fail catastrophically.

SUMMARY OF THE INVENTION

In accordance with the present invention, the above-discussed problems of wear and bounce created by imperfections in the surface of a magnetic recording medium, such as a chromium dioxide-coated drum, are circumvented by a hydrodynamic magnetographic imaging technique that provides the intended effective intimate contact between the recording head and the magnetographic recording surface, yet is effectively readily evaportable from the magnetographic recording surface, so that the recording surface can be rapidly cleaned and ready for the application of toner for each successive image reproduction cycle. Pursuant to the inventive scheme a liquid (e.g. water, alcohol, acetone) or a mixture of such liquids, that are readily evaporatable and do not leave a dirt or dust particle attractive, clinging film, as does oil, is applied to the surface of the drum slightly upstream of the location of the recording head, so as to create a readily evaporatable liquid bearing against which the recording head is urged, and thereby intimately magnetically coupled with the surface of the drum, except for an extremely thin liquid film between the head and drum surface.

As a result of this extremely thin liquid bearing, continuous pressure can be applied to the head to maintain the head in effective intimate contact with the surface of the recording medium without the fear of scratching the medium or causing wear on the head. Thus, the sliding characteristics between head and drum attained at low velocities are achieved without the problems associated with the higher relative tangential speeds. Also the movement, per se, of the fluid past the head creates a Bernoulli suction effect that acts to urge the head toward the recording surface; this action is further aided by the hydrostatic action of the fluid. Moreover, within the fluid bearing, foreign matter that might otherwise accumulate between the head and the recording surface, is placed in solution or suspension, so that the bearing helps to clean the head and the drum.

Preferably the bearing is generated by a simplified sponge/squeegee liquid applicator that rests on the drum upstream of and adjacent to the recording head. The bearing liquid is supplied to the sponge from a fluid inlet line, to create a trickle flow from the sponge. This trickle of liquid is converted into a thin film by a squeegee blade that rests against the drum. For the purpose of controlling the flow of the liquid to the applicator the fluid inlet line may be positioned to be selectively pinched and relaxed by the mechanism that displaces the recording head relative to the recording surface. When the head is retracted from the surface (as after imaging) the liquid supply line is pinched off, to interrupt the supply of bearing liquid to the applicator, so that the liquid film/bearing is not generated. In the course of cleaning the surface of the drum in preparation for its use at a reproduction/printing station, a curtain of hot air is directed against the drum in the vicinity of the cleaning station, so that the water is readily evaporated and the drum is effectively clean and ready for use at the printing station.

At the recording station/imaging when the head is urged toward the recording surface, the head displacement mechanism relieves its grip on the liquid feed line and the bearing is applied to the recording surface just prior to the head reaching its recording position, so that the head will come into contact with the bearing at that location.

BRIEF DESCRIPTION OF THE DRAWINGS

FIG. 2 is an enlarged illustration of the details of the liquid bearing applicator shown schematically in FIG. 1.

DETAILED DESCRIPTION

Figure 1:
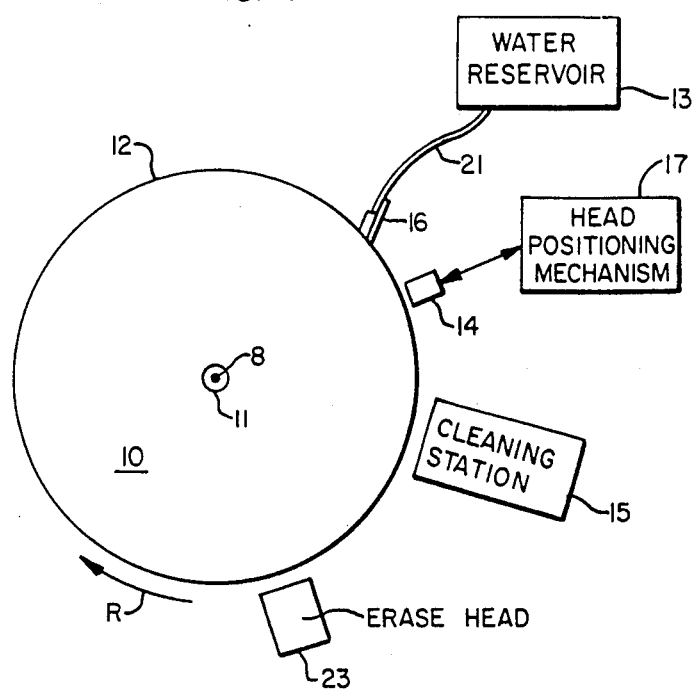
FIG. 1 depicts a schematic side view of a magnetographic recording apparatus employing the hydrodynamic imaging device of the present invention.

Referring now to FIG. 1, their is shown a general schematic side view of a magnetographic recording apparatus employing the hydrodynamic imaging device of the present invention. The term hydrodynamic is used in a non-limitative sense, to denote the use of a liquid that has the characteristics of or behaves as water in performing the bearing/cleaning action desired while still being readily evaporatable, not leaving a dust (toner particle) clinging residue, such as the oil bearings mentioned previously. The apparatus may include a single station for both imaging (recording) and reproduction (hard copy generation), as is conventionally employed in both electrographic and magnetographic apparatus (as described in the above-referenced Edwards et al patent), or it may employ a multiple station arrangement, such as described in copending patent application Ser. No. 603,902, filed Apr. 25, 1984, entitled "Transfer Mechanism for Multiple Magnetographic Imaging/Recording Apparatus", by C. H. DuFour and M. F. Duchesne, and assigned to the Assignee of the present application. In the description to follow and in the illustration of FIG. 1, it will be assumed that imaging station and printing station are separated from one another with the multiple magnetographic drums being interchanged between the two stations for the separate functions performed thereby, as described in the above-identified copending application. For such an environment, the schematic illustration of the configuration of the recording station may be simplified since the details of the printing sector (decorator, web transfer mechanism, etc.) are unnecessary for an understanding of the present invention and, accordingly, are not shown or described here.

In FIG. 1, a recording drum 10 is shown as being rotatable in a clockwise direction R by a suitable drive mechanism (not shown) about the axis 8 of a drum axle 11. The surface of drum 10 is made of magnetically responsive recording material, such as a layer of chromium dioxide, as is standard practice in the art. Other magnetically responsive materials such as iron oxide or nickel/cobolt may also be used as the drum surface material. Circumferentially disposed around drum 10 are a record head 14, cleaning station 15 and an erase head 23. These components, per se, are of conventional configuration (e.g. clean station 15 includes the usual roller brushes, vacuum knives, magnet pick-up elements etc.) and not, per se, constituting the present invention, will not be described in detail here. They are shown simply to illustrate some of the components of a magnetographic recording environment, familiar to the skilled artisan, in which the present invention may be employed.

Recording head 14 is displaceable, in a radial direction relative to the axis of drum 10, toward and away from surface 12 by a head positioning mechanism 17. As described briefly above for the record mode magnetic recording head 14 is urged by head positioning mechanism into effective intimate contact with the surface 12 of drum 10, whereby information signals that are coupled to head 14 may be recorded on surface 12 in the form of modulated magnetic regions in the chromium oxide layer representative of those information signals.

Adjacent to and upstream (in terms of direction of rotation R of drum 10) of magnetic recording head 14 is a liquid bearing applicator 16 (shown in detail in FIG. 2, described below) which creates a liquid bearing between head 14 and surface 12 so that the degree of coupling between the transducer surface of head 14 and surface 12 may be significantly improved compared to schemes wherein no such bearing is provided. Applicator 16 is coupled to a liquid supply source 13 by way of a fluid supply line 21, through which the bearing liquid (e.g. water, alcohol, acetone or a mixture of such liquids that readily evaporate and do not leave a dirt or dust particle (e.g. toner particles) attractive, clinging film) is supplied, as by gravitational flow. Where the surface of the recording drum 10 contains iron oxide or chromium dioxide (in a resin binder), the bearing liquid should not include acetone, since acetone is a solvent for the resin binder. However, acetone is compatible with other magnetic recording media such as a nickel/cobolt drum surface, mentioned above. As will be explained below, with reference to FIG. 2, flow line 21 may be mechanically coupled with head positioning mechanism 17 so that the flow of the bearing liquid therethrough is selectively controlled in response to the displacement of head 14 relative to surface 12. For the purpose of the description of FIG. 1, it is to be understood that the bearing liquid, such as water, is supplied from a source 13 through line 21 to applicator 14, so that a thin film or layer of liquid (e.g. water) is formed on surface 12 of drum 10 and is carried on drum 10 past the position of magnetic recording head 14. As head 14 is urged toward surface 12 of drum 10 it encounters this liquid film which acts as a bearing on which head 14 rides as the drum is rotated therepast in the direction of drum rotation R.

Referring now to FIG. 2, the details of the liquid bearing applicator are shown as including a sponge 31 and a squeegee rubber strip 32 against which sponge 31 abuts, so that the liquid released thereby will be directed onto the surface 12 of drum 10 to form a thin liquid bearing 51 that is carried past the position of recording head 14. The bearing liquid supplied to applicator 14 from a liquid supply reservoir (not shown), corresponding to source 13 of FIG. 1. As the bearing liquid flows, as under the influence of gravity through line 21, sponge 31 becomes saturated and emits a trickle sufficient to create a thin film 51 by the action of squeegee rubber strip 32, the edge portion 36 of which rides on the liquid bearing 51 as it is carried along drum 10.

Downstream of applicator 16 is the magnetic recording head 14. Head 14 is affixed to one end of a flat spring or band 33, the other end of which is held by a rigidly-fixed support block 38. Band 33 may comprise a strip of beryllium that is cantilevered at block 38 so that head 14 in turn, is supported in a cantilevered fashion at block 38. Displacement of head 14 toward and away from surface 12 is accomplished by a positioning rod 42 which engages head 14 and is displaceable in a radial direction (relative to the axis of drum 10) by a drive motor 44 in the direction of arrows 47. Positioning rod 42 engages a pinch bar 41 such that displacement of rod 42 causes a corresponding displacement of pinch bar 41.

Disposed adjacent to but spaced part from pinch bar 41 is a head support base 47 through which a guide pin 36 passes. Liquid flow feed line 21 passes in a space or channel between support base 47 and pinch bar 41, so that, in the position shown in FIG. 2, line 21 is not constricted and the liquid is permitted to flow through line 21 to the applicator 16. When drive source 44 is operated to retract recording head 14 away from drum 10, pinch bar 41 is displaced towards support base 47, whereby line 21 becomes constricted or pinched between pinch bar 41 and support base 47, to thereby interrupt the flow of the bearing liquid to applicator 16. Such displacement of head 14 takes place subsequent to the record mode of operation of drum 10 prior to its use of a printing drum at a printing station (not shown). By mechanically coupling flow line 21 with the displacement mechanism for head 17 in the manner shown in FIG. 2, a simple scheme for synchronizing liquid bearing generation to head engagement with drum 10 is provided. When head 14 is to be displaced from its retracted position to effective contact with drum 10 for imaging, displacement of rod 42 moves pinch bar 41 away from support base 42 prior to head 14 reaching surface 12 of drum 10, so that the hydrodynamic bearing is formed between head 14 and surface 12, before head 14 would otherwise contact drum 10.

Depending on the thickness of bearing 51 as defined by applicator 16, the pressure applied to head 14 is established to maintain the desired magnetic coupling (e.g. physical spacing) between the transducer surface of head 14 and surface 12 of drum 10. This may be on the order of an ounce or two of pressure provided by source 44 and beryllium band 33, so that a slight pressure is exerted on head in a direction normal to surface 12. This slight pressure is sufficient to keep head 14 riding on the bearing layer 51, but insufficient to override the back pressure of bearing layer 51, so that head 14 is prevented from actually touching surface 12.

Figure 3:
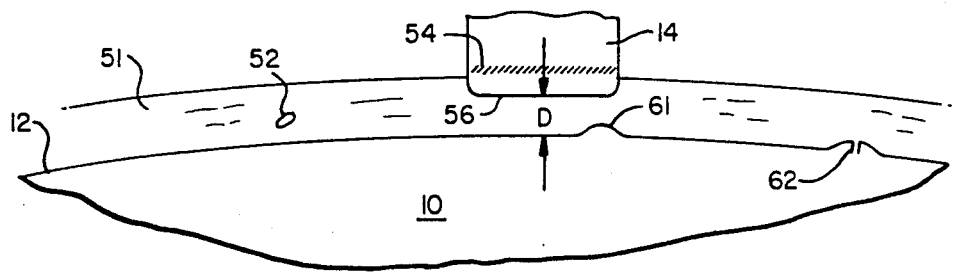
FIG. 3 is an exaggerated illustration of the coupling of a magnetic recording head and a fluid bearing on the surface of a recording medium.

FIG. 3 shows an exaggerated (not to scale) illustration of head 14 as it rides on liquid bearing 51. As described above, the thickness of the liquid film bearing 51 is controllable by means of the liquid flow from the positioning of applicator 16 relative to surface 12 of drum 10. The exact thickness of bearing 51 will depend, of course, on the rotational speed of drum 10 past the applicator 16 and head 14 and the quality of surface 12. These factors are readily established emperically based upon station size and configuration and need not be precisely determined prior to system set up. As mentioned above, liquid flow rate based simply upon the influence of gravity has been found to provide a bearing that meets the performance objectives of the present invention.

The action of bearing 51 as illustrated in FIG. 3 not only provides a slight separation D between the transducer magnetic coupling face 56 of head 14 from the surface 12 to prevent contact between head 14 and imperfections in the surface 12, such as bump 61 and seam 62, but maintains foreign matter, such as a toner or dust particles 52, in solution, away from transducer face 56 and surface 12. This latter action prevents a build up of foreign matter on these surfaces which would otherwise detrimentally affect the intended performance of the recorder, as mentioned previously. Moreover, as pointed out above, because the liquid of which bearing 51 is formed readily evaporates without leaving a residue, as contrasted with the oil bearings of the recording mechanism described in the above mentioned patents to Ledin et al and Lynott, the recording drum can be kept clean for successive reproduction cycles of toner application and transfer to copy material. Not surprisingly, some of the foreign matter that is carried by bearing 51 floats on the surface of the liquid and, over time, forms a "bathtub ring" 54 on the side surface of head 14. However, this ring is at a location on head 14 that does not affect performance or cause wear of the head, and can be easily removed when the head itself is removed for cleaning.

As will be appreciated from the foregoing description a substantial improvement in performance and component life of a magnetographic recording apparatus can be achieved in accordance with the hydrodynamic recording scheme of the present invention. The structure for imparting the liquid bearing to the drum surface is simple and does not affect the magnetic coupling forces between the recording head and the chromium dioxide surface. In this regard, while a sponge and squeegee rubber strip applicator have been shown and described as a mechanism for applying the liquid bearing to the drum surface, other compatible arrangements such as a spray mist-imparting applicator may be used. The benefits in recording performance provided by the present invention are especially noteworthy when considering the capabilities of a magnetographic recording apparatus as contrasted to electrographic systems. In the latter type of system, reapplication or regeneration of the latent image on the recording surface is required for each document to be printed. In a magnetographic apparatus, however, once the image has been recorded, it is effectively permanent until erased. Thus, production yield for a magnetographic apparatus is potentially a greater than that for an electrographic system. Prior to the present invention, however, the performance of and thereby quality of image recorded by magnetographic apparatus have been limited by the head wear and bounce problems, discussed above, that are solved by the inventive hydrodynamic imaging scheme which provides the problem-solving liquid bearing and also enables the recording drum to be maintained clean for successive print cycles. Since effective intimate magnetic coupling between head and image recording surface necessary to achieve any desired resolution is attainable using the hydrodynamic imaging technique according to the invention, a magnetographic recording apparatus employing the same is cost and yield-wise superior to conventional electrographic and magnetographic systems.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use in a recording apparatus wherein a prescribed characteristic of a recording medium is established by a transducer coupled therewith, a method of controlling the coupling of said transducer to said medium comprising the step of:
   forming a liquid bearing between the surface of said recording medium and said transducer, said liquid being of the type that will effectively readily evaporate without leaving a residue.

2. A method according to claim 1, wherein and step (a) comprises forming a thin film a liquid consisting of one or more of water, alcohol, acetone, on the surface of said recording medium.

3. A method according to claim 1, wherein said recording medium includes a magnetically responsive recording material and said transducer comprises a magnetic head.

4. A method according to claim 3, wherein said recording apparatus comprises a magnetographic recording apparatus in which an image that has been formed on a magnetic recording medium is transferred to a further recording medium by the application of toner to said magnetic recording medium subsequent to the effective evaporation of said liquid bearing from the surface of said magnetic recording medium.

5. A method according to claim 3, further including the step of removing said liquid from the surface of said recording medium so that the surface of said recording medium is effectively free of said liquid prior to the application of recorded image transfer material to said recording medium.

6. A method according to claim 4, wherein said recording medium includes rotatable drum having a region of magnetic field responsive material at the surface thereof and said step comprises forming a thin liquid film on the surface of said drum in proximity of the position of said transducer relative to said drum.

7. A method according to claim 4, wherein said transducer is displaceable relative to the position at which a prescribed magnetic characteristic is established in said recording medium and said step includes forming said liquid bearing on the surface of said recording medium prior to locating said transducer at said position.

8. A method according to claim 7, including the step of moving said transducer relative to said position and thereby controlling the formation of said liquid bearing.

9. A method according to claim 8, wherein said bearing comprises a thin film of a liquid consisting of one or more of water, alcohol, acetone.

10. A method according to claim 1, further including the step of removing said liquid from the surface of said recording medium so that said surface of said recording medium is effectively free of said liquid.

11. For use in an apparatus wherein a prescribed characteristic of a recording medium is established by a transducer coupled therewith, arrangement for controlling the coupling of said transducer to said recording medium comprising:
    means for applying to said recording medium a liquid of the type that will effectively readily evaporate without leaving a residue; and
    means for causing a liquid film to be provided at at least that portion of said recording medium at which said transducer is coupled to establish said prescribed characteristic, so as to provide an effective cushion between said transducer and the surface of said recording medium.

12. An arrangement according to claim 11, wherein said liquid apply means includes means for applying a thin film of a liquid consisting of one or more of water, alcohol, acetone on the surface of said recording medium.

13. An arrangement according to claim 11, wherein said apparatus includes means for moving said recording medium relative to said transducer, said liquid film being carried past said transducer during the relative movement between said recording medium and said transducer.

14. An arrangement according to claim 13, wherein said liquid applying means comprises means for causing said liquid to be directed onto said recording medium and means for establishing the thickness of the liquid film that is formed on said recording medium.

15. An arrangement according to claim 11, wherein said recording medium includes a magnetically responsive recording material and said transducer comprises a magnetic head.

16. An arrangement according to claim 15, wherein said recording medium includes a rotatable cylindrically-shaped body having a region of magnetic field responsive material at the surface thereof, and said liquid applying means includes means for forming a thin liquid film on the surface of said body in proximity of the position of said transducer relative to said body.

17. An arrangement according to claim 11, wherein said recording apparatus comprises a magnetographic recording apparatus in which an image that has been formed on a magnetic recording medium is transferred to a further recording medium by the application of toner to said magnetic recording medium subsequent to the effective evaporation of said liquid bearing from the surface of said magnetic recording medium.

18. An arrangement according to claim 17, further including means for removing said liquid from the surface of said recording medium so that said surface of said recording medium is effectively free of said liquid prior to the application of recorded image transfer material to said recording medium.

19. An arrangement according to claim 17, wherein said transducer comprises a magnetic head displaceable relative to the position at which said magnetic head is operable to establish a prescribed magnetic characteristic in the surface of said recording medium.

20. An arrangement according to claim 19, wherein said liquid applying means includes means for controlling the application of said liquid to said recording medium in dependence upon the displacement of said magnetic head.

21. An arrangement according to claim 20 wherein said liquid applying means comprises means for applying a liquid consisting of one or more of water, alcohol, acetone to said recording medium.

22. An arrangement according to claim 11, further including means for removing said liquid from the surface of said recording medium so that said surface of said recording medium is effectively free of said liquid.

23. For use in a magnetographic recording apparatus having a magnetic field responsive recording medium the magnetic storage characteristics of which are established by magnetic field generating transducer coupled therewith, an arrangement for controlling the coupling of said transducer to the surface of said medium comprising:
  means for applying to said recording medium a liquid of the type that will effectively readily evaporate without leaving a residue; and
  means for causing a liquid film to be provided at at least that portion of said recording medium at which said transducer is coupled so as to provide an effective cushion between said transducer and the surface of said recording medium.

24. An arrangement according to claim 23, wherein said liquid applying means includes means for applying a thin film of a liquid consisting of one or more of water, alcohol, acetone on the surface of said recording medium.

25. An arrangement according to claim 23, wherein said apparatus includes means for moving said recording medium relative to said transducer, said liquid film being carried past said transducer during the relative movement between said recording medium and said transducer.

26. An arrangement according to claim 25, wherein said liquid applying means comprises means for causing said liquid to be directed onto said recording medium and means for establishing the thickness of the liquid film that is formed on said recording medium.

27. An arrangement according to claim 25, wherein said recording medium includes a rotatable cylindrically-shaped body having a region of magnetic field responsive material at the surface thereof, and said liquid applying means includes means for forming a thin liquid film on the surface of said in proximity of the position of said transducer relative to said body.

28. An arrangement according to claim 25, wherein said transducer comprises a magnetic head displaceable relative to the position at which said magnetic head is operable to establish a prescribed magnetic characteristic in the surface of said recording medium.

29. An arrangement according to claim 28, wherein said liquid applying means includes means for controlling the application of said liquid to said recording medium in dependence upon the displacement of said magnetic head.

30. An arrangement according to claim 23, further including means for removing said liquid from the surface of said recording medium so that the surface of said recording medium is effectively free of said liquid prior to the application of recorded image transfer material to said recording medium.

31. For use in a magnetographic recording apparatus having a magnetic field responsive recording medium the magnetic storage characteristics of which are established by a magnetic field generating transducer coupled therewith, an arrangement for proving effective intimate magnetic coupling between said transducer and the surface said recording medium irrespective of imperfections in the surface of said recording medium or the contamination thereof by foreign matter comprising:
  means for applying to the surface of said recording medium a liquid of the type that will effectively readily evaporate without leaving a residue; and
  means for causing a liquid film to be provided at at least that portion of said recording medium at which said transducer is coupled, so that, with said transducer being urged toward physical contact with the surface of said recording medium, said liquid film acts as a cushion to prevent said physical contact but to provide said effective intimate magnetic coupling between said transducer and said recording medium.

32. An arrangement according to claim 31, wherein said liquid applying means includes means for applying a thin film of a liquid consisting of one or more of water, alcohol, acetone on the surface of said recording medium.

33. An arrangement according to claim 31, wherein said apparatus includes means for moving said recording medium relative to said transducer, said liquid film being carried past said transducer during the relative movement between said recording medium and said transducer.

34. An arrangement according to claim 31, wherein said liquid applying means comprises means for causing said liquid to be directed onto said recording medium and means for establishing the thickness of the liquid film that is formed on said recording medium.

35. An arrangement according to claim 31, wherein said recording medium includes a rotatable cylindrically-shaped body having a region of magnetic field responsive material at the surface thereof, and said liquid applying means includes means for forming a thin liquid film on the surface of said body in proximity of the position of said transducer relative to said body.

36. An arrangement according to claim 31, further including means for removing said liquid from the surface of said recording medium so that the surface of said recording medium is effectively free of said liquid prior to the application of recorded image transfer material to said recording medium.

* * * * *